United States Patent
Naccari et al.

(10) Patent No.: US 9,451,222 B2
(45) Date of Patent: Sep. 20, 2016

(54) COLOR PROCESSING OF DIGITAL IMAGES

(71) Applicant: STMICROELECTRONICS S.R.L., Agrate Brianza (IT)

(72) Inventors: Filippo Naccari, Tremestieri Etneo (IT); Arcangelo Ranieri Bruna, Giardini Naxos (IT); Simone Bianco, Cesano Boscone (IT); Raimondo Schettini, Milan (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 0 days.

(21) Appl. No.: 14/066,395

(22) Filed: Oct. 29, 2013

(65) Prior Publication Data
US 2014/0118585 A1    May 1, 2014

(30) Foreign Application Priority Data
Oct. 29, 2012    (IT) .............. VI2012A0291

(51) Int. Cl.
*H04N 5/208* (2006.01)
*H04N 9/07* (2006.01)
*H04N 1/60* (2006.01)
*H04N 9/67* (2006.01)
*H04N 5/14* (2006.01)

(52) U.S. Cl.
CPC .............. *H04N 9/07* (2013.01); *H04N 1/6072* (2013.01); *H04N 5/142* (2013.01); *H04N 9/67* (2013.01)

(58) Field of Classification Search
CPC .............. H04N 5/142; H04N 5/208
USPC ......................................................... 348/252
See application file for complete search history.

(56) References Cited

U.S. PATENT DOCUMENTS

| | | | |
|---|---|---|---|
| 5,231,677 A * | 7/1993 | Mita et al. ................... | 382/266 |
| 6,317,157 B1 * | 11/2001 | Takayama .............. | G09G 1/167 348/254 |
| 6,768,514 B1 * | 7/2004 | Tsuchiya et al. ............. | 348/252 |
| 2002/0149685 A1 * | 10/2002 | Kobayashi et al. .......... | 348/252 |
| 2003/0086606 A1 * | 5/2003 | Hunter et al. ................ | 382/167 |
| 2003/0169941 A1 * | 9/2003 | Lin et al. ...................... | 382/266 |
| 2004/0057630 A1 * | 3/2004 | Schuhrke et al. ............ | 382/254 |
| 2004/0252316 A1 * | 12/2004 | Miyagi et al. ................ | 358/1.9 |
| 2007/0292041 A1 | 12/2007 | Ito | |
| 2008/0101716 A1 * | 5/2008 | Ho ................................ | 382/266 |

(Continued)

FOREIGN PATENT DOCUMENTS

EP    1936952    6/2008

OTHER PUBLICATIONS

Search Report for Italian patent application No. VI20120291; Munich, Germany, Jun. 26, 2013; 2 pages.

(Continued)

*Primary Examiner* — Anthony J Daniels
(74) *Attorney, Agent, or Firm* — Seed IP Law Group PLLC

(57) ABSTRACT

An embodiment relates to a method for color processing of an input image, the method including the steps of low-pass filtering of the input image to obtain a low-pass component, high-pass filtering of the input image to obtain a high-pass component, processing the input image for edge detection to obtain edginess parameters, and performing a color-space transformation of the input image based on the low-pass component, the high-pass component, and the edginess parameters.

23 Claims, 2 Drawing Sheets

(56) References Cited

U.S. PATENT DOCUMENTS

2008/0143844 A1* 6/2008 Innocent ............... H04N 9/735
348/223.1
2014/0355904 A1* 12/2014 Olsson ......................... 382/263

OTHER PUBLICATIONS

Igor Kharitonenko, Sue Twelves, and Chaminda Weerasinghe, "Suppression of Noise Amplification During Colour Correction", IEEE, vol. 48, No. 2, May 2002, pp. 229-233.

SukHwan Lim, and Amnon Silverstein, "Spatially Varying Color Correction (SVCC) Matrices for Reduced Noise", HP Technical Reports, HP Laboratories Palo Alto, CA; HPL-2004-99, Jun. 2, 2004; 6 pages.

Y.H. Kim, and J. Lee, "Image Feature and Noise Detection Based on Statistical Hypothesis Tests and Their Applications in Noise Reduction", IEEE Transactions on Consumer Electronics, vol. 51, No. 4, Nov. 2005, pp. 1367-1378.

Ford et al., "Colour Space Conversions," Aug. 11, 1998, 31 pages.

* cited by examiner

COLOR PROCESSING OF DIGITAL IMAGES

PRIORITY CLAIM

The instant application claims priority to Italian Patent Application No. VI2012A000291, filed Oct. 29, 2012, which application is incorporated herein by reference in its entirety.

TECHNICAL FIELD

An embodiment relates to the field of image processing, in particular, to color processing of digital images and, particularly, to a color-processing system employing color-space matrix transforms.

SUMMARY

Digital imaging devices for capturing images, for example, mobile and digital still cameras or video cameras or LCD imaging signal processors, operate by means of image sensors. The spectral sensitivities of the sensor color channels usually do not match those of a desired output color space. Therefore, some color processing (matrixing) is typically needed to achieve colors of the desired color space.

A typical image-reconstruction (color-correction) pipeline implemented in an imaging device, for example, a digital camera reads (for a gamma correction of 1)

$$\begin{bmatrix} R_o \\ G_o \\ B_o \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} r_{gw} & 0 & 0 \\ 0 & g_{gw} & 0 \\ 0 & 0 & b_{gw} \end{bmatrix} \begin{bmatrix} R_i \\ G_i \\ B_i \end{bmatrix},$$

where $R_i$, $G_i$, $B_i$, are the device raw RGB values and $R_o$, $G_o$, $B_o$ are the desired output RGB values. The RGB space is used for exemplary purposes. The diagonal matrix diag $(r_{gw}, g_{gw}, b_{gw})$ performs white balancing, i.e., it is provided for luminance compensation. The 3×3 matrix with matrix elements $a_{11}, \ldots, a_{33}$ is a color matrix for color-space transform (matrixing) from the device RGB space to a standard color space (e.g., sRGB, AdobeRGB, etc).

However, the color-space transform can produce artifacts resulting in a degradation of the image quality in the desired, e.g., sRGB space. In particular, in the case of small-gamut sensors, the noise in the output color space typically exceeds the original noise in the device color space, i.e., for example, for the red channel, under the assumption that the noise in the device color space is the same for all RGB channels:

$$\frac{\sigma_{R_o}}{\sigma_{R_i}} = \sqrt{a_{11}^2 + a_{12}^2 + a_{13}^2} > 1,$$

where $\sigma_{R_o}$ and $\sigma_{R_i}$ represent the noise in the red channel after the transformation and before the transformation, respectively.

Thus, typically, color processing leads to noise amplification.

Therefore, an embodiment is a method for color processing that alleviates noise amplification significantly as compared to conventional schemes.

An embodiment addresses the above-mentioned problem and provides a method for color processing of a (digital) input image, the method including the steps of:

Low-pass filtering of the (e.g., color channels of the) input image to obtain a low-pass component (e.g., for each color channel);

High-pass filtering of the (e.g., color channels of the) input image to obtain a high-pass component (e.g., for each color channel);

processing the input image for edge detection to obtain edginess parameters (e.g., one edginess parameter for each pixel of the input image); and performing a color-space transformation of the input image based on the low-pass component, the high-pass component, and the edginess parameters. The input image is, for example, an RGB image.

By low-pass filtering, slowly varying background patterns that can be interpreted as wave patterns with long wavelengths (low frequencies) are stressed, whereas by high-pass filtering, highly varying details with short wavelengths (high frequencies) are stressed. Both low- and high-pass filtering can, in principle, be performed in the spatial or frequency domain in a conventional manner.

The low-pass filtering can, for example, be performed by means of a low-pass filter with a bandwidth selected based on the resolution (number of pixels) of the input image.

If m and n are respectively the number of rows and columns of the input image, then the size of the low-pass filter convolution kernel can be calculated, for example, in the following way: LPk=(m*n)/S, where S is a suitable scaling factor.

Whereas gamut mapping based on color matrix operations of conventional digital cameras leads to a set of correction coefficients that causes significant reduction of the signal-to-noise ratio (SNR), according to an embodiment little or no significant noise is produced. This is achieved by adapting matrixing (color matrix application) based on the total information given by the low- and high-pass components and the edginess information. The edge detection is performed in order to discriminate between pixels belonging to flat or edge regions of the input image. In particular, the edge detection may include corner detection.

The edginess parameter represents the edginess of a pixel. For each pixel of the input image, a respective edginess parameter can be determined. For example, a normalized edginess parameter of the interval [0, 1], wherein 0 and 1 represent a likelihood of 0% and 100% probability, respectively, that a pixel belongs to an edge of the input image (or a corner of the input image), can be determined (see also detailed description below). The edginess parameters can, particularly, be determined based on a set of mask patterns used to identify vertical, horizontal and diagonal edges and corners. Moreover, the edginess parameters can be determined in the spatial RGB domain and based on the entire information of one or more RGB color channels.

According to an example where the color space has three dimensions or channels (e.g., RGB), the color-space transformation of the input image is performed for each pixel of the input image according to:

$$C_i'=(C_{1_{LP}}+\alpha C_{1_{HP}})m_{i0}+(C_{2_{LP}}+\alpha C_{2_{HP}})m_{i1}+(C_{3_{LP}}+\alpha C_{3_{HP}})m_{i2}+(1-\alpha)C_{i_{HP}} \quad i=1,2,3$$

where $C_{i_{LP}}$ denotes the low-pass component of the pixel for the i-th channel (i-th channel of the low-pass component), $C_{i_{HP}}$ denotes the high-pass component of the pixel for the i-th channel (i-th channel of the high-pass component), α denotes the edginess parameter of the pixel, and $m_{i,j}$ denotes the i,j coefficient of a color matrix.

The color-matrix coefficients depend mainly on the response of the camera color filters and the target standard color space. They also could be dynamically calculated for the white-balancing estimation results. An example reads $$M = \begin{bmatrix} 1.9 & -0.6 & -0.3 \\ -0.3 & 1.6 & -0.3 \\ -0.5 & -0.7 & 2.2 \end{bmatrix}.$$

The above-described examples of an embodiment can also be implemented in the context of image processing for tone mapping (dynamic range compression). In general, an application of digital gain greater than 1.0 produces a signal degradation in terms of SNR.

Both the application of digital gains to input RGBi signals for white-balancing compensation and the gamma encoding applied to linear output RGBo signals can benefit from an embodiment.

Another embodiment is a computer-program product including one or more computer-readable media having computer-executable instructions for performing the steps of a method according to an embodiment such as according to one of the above-described examples.

The above-mentioned problem can also be solved by an image-processing device, including a processor (for example, an imaging signal processor or an LCD imaging signal processor) configured for:

Low-pass filtering of the input image to obtain a low-pass component;

high-pass filtering of the input image to obtain a high-pass component;

processing the input image for edge detection to obtain edginess parameters; and performing a color-space transformation of the input image based on the low-pass component, the high-pass component, and the edginess parameters.

In particular, the processor may be configured to perform the color-space transformation of the input image for each pixel of the input image according to:

$$C_i' = (C_{1_{LP}} + \alpha C_{1_{HP}}) m_{i0} + (C_{2_{LP}} + \alpha C_{2_{HP}}) m_{i1} + (C_{3_{LP}} + \alpha C_{3_{HP}}) m_{i2} + (1-\alpha) C_{i_{HP}} \; i=1,2,3$$

where $C_{i_{LP}}$ denotes the low-pass component of the pixel for the i-th channel (i-th channel of the low-pass component), $C_{i_{HP}}$ denotes the high-pass component of the pixel for the i-th channel (i-th channel of the high-pass component), $\alpha$ denotes the edginess parameter of the pixel, and $m_{ij}$ denotes the i,j coefficient of a color matrix.

The image-processing device can, for example, include or consist of a digital (still) camera. It can also be some LCD display device including a display-driver circuit wherein an embodiment of the above-described method is implemented.

Another embodiment is an image-processing device including a low-pass filter for low-pass filtering of the input image to obtain a low-pass component, a high-pass filter for high-pass filtering of the input image to obtain a high-pass component, an edge-detection means for processing the input image for edge detection to obtain edginess parameters, and a color-matrix-application means for performing a color-space transformation of the input image based on the low-pass component, the high-pass component, and the edginess parameters.

According to a particular example, the high-pass component is obtained based on the difference of the input image and the low-pass component. For example, the pixel values of the low-pass component are subtracted from the pixel values of the input image.

BRIEF DESCRIPTION OF THE DRAWINGS

One or more features and advantages will be described with reference to the drawings. In the description, reference is made to the accompanying figures, which are meant to illustrate one or more embodiments, although it is understood that such embodiments may not represent the full scope of the teachings of the disclosure.

DETAILED DESCRIPTION

Figure 1:
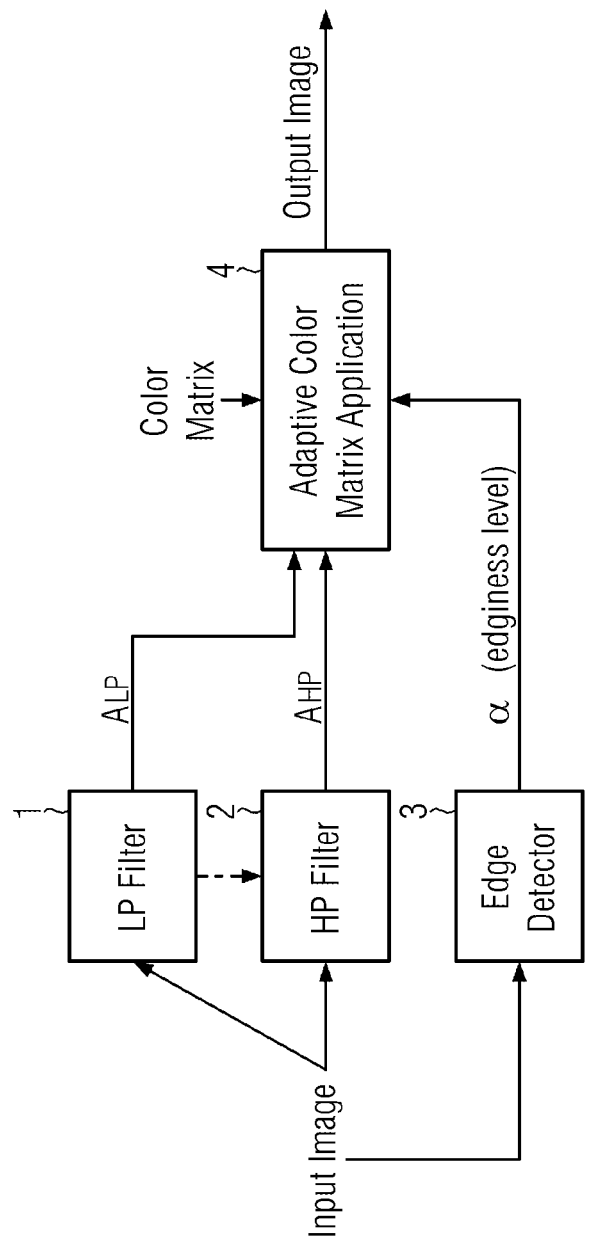
FIG. 1 illustrates an example of color processing based on color matrixing, according to an embodiment.

An example for adaptive color-matrix application for color-space transform of an image is illustrated in FIG. 1, according to an embodiment. An RGB input image is processed by a low-pass filter 1 to obtain a low-pass component $A_{LP}$, and by a high-pass filter 2 to obtain a high-pass component $A_{HP}$. According to an example, the high-pass component is obtained by determining the difference of the pixel values of the input image and the pixel values of the low-pass component. In addition, the digital input image is processed for edge detection by an edge-detection means 3, which provides edginess parameters $\alpha$ for each pixel of the input image. The edge-detection means 3 estimates the likelihood [0, 1] that a pixel is part of an edge or a corner pixel. The low-pass component $A_{LP}$ and high-pass component $A_{HP}$, and the edginess parameters $\alpha$ are input to a color-matrix application means 4, which performs matrixing of the input image based on the input information provided by the low-pass filter 1, the high-pass filter 2, and the edge-detection means 3.

Figure 2:
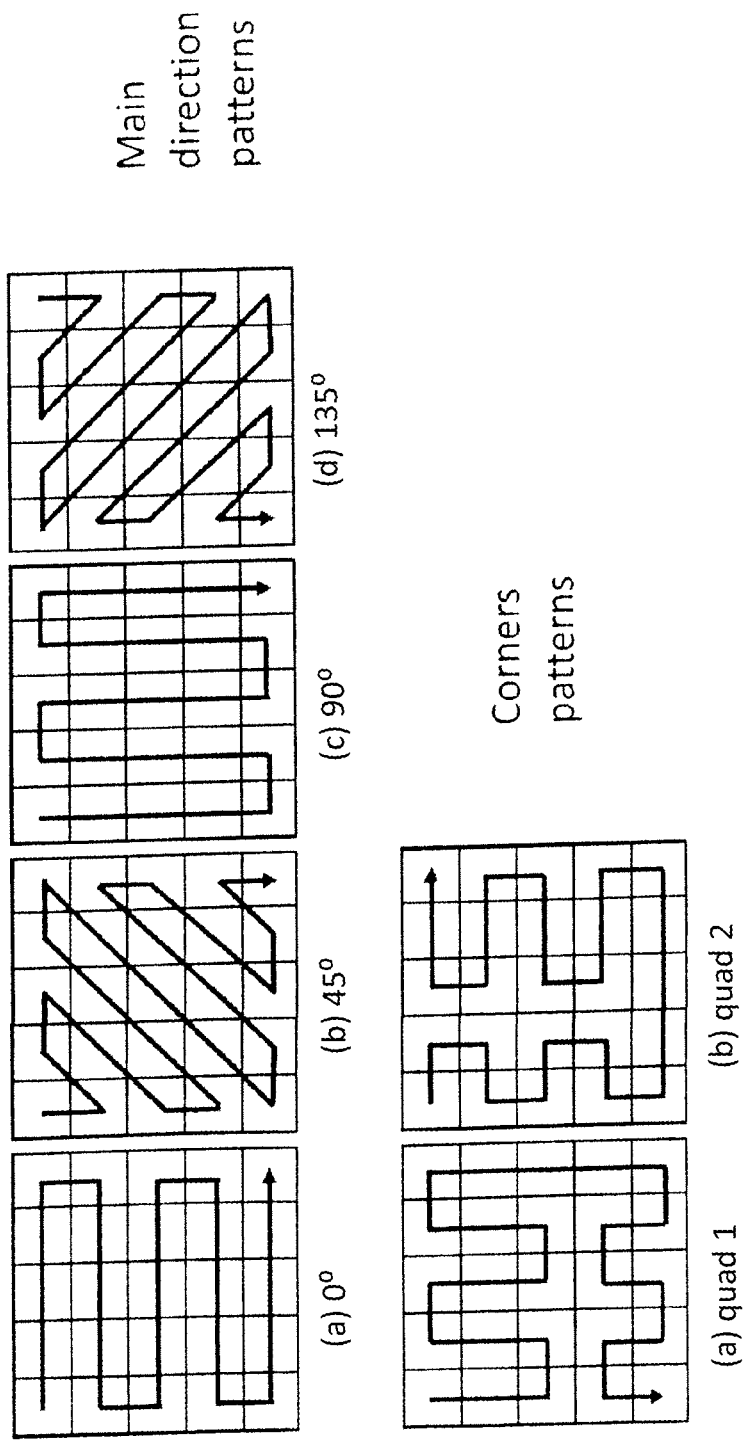
FIG. 2 shows exemplary mask patterns that can be used for edge or corner detection, according to an embodiment.

In detail, according to an example, the edge-detection means 3 adopts six mask patterns as illustrated in FIG. 2 in order to detect both edges and corners. The edge-detection means 3 may operate in the spatial RGB domain. It may make use of information of all channels. Moreover, across different patterns, different functions to accumulate the edginess parameters, and different weighting masks to obtain a better edge-detection precision, can be used.

The number of potential masks to be used for edge detection can be extended, thus leading to the possibility of detecting edges of any orientation with a greater accuracy. The herein disclosed embodiment for edge detection has been initially based on a the following paper, Yeong-Hwa Kim, and Jaeheon Lee, "Image Feature and Noise Detection Based on Statistical Hypothesis, Tests and Their Applications in Noise Reduction", IEEE Transactions on Consumer Electronics, vol. 51, n. 4, November 2005, which is incorporated by reference. However, an embodiment of the disclosed accumulation function has been modified, and, to an embodiment, pattern masks for corner detection, and the possibility of using weighting masks, has been added.

Consider n color channels and m pattern masks of size s each. An edginess level of a pixel of the input image for the i-th channel related to the k-th edge pattern can be determined by:

$$E_{ki} = \sum_{j=1}^{s} |C_{i,(j+1)_k} - C_{ij_k}| w_{j_k}; i=1, 2, \ldots, n; k=1, 2, \ldots, m,$$

where $C_{ij_k}$ denotes the pixel value of the i-th channel at the j-th position of the k-th pattern and $w_{j_k}$ denotes the weight selected from the interval [0, 1] at the j-th position of the k-th pattern. For the i-th color channel one obtains:

$$E_i = \sum_{k=1}^{m} E_{ki}; i = 1, 2, \ldots, n$$

Normalization to the interval [0, 1] is obtained by:

$$\overline{E}_i = \frac{E_i}{(s-1)(2^b-1)},$$

where b is the bit depth of the i-th color channel quantifying how many unique colors are available in an image's color palette. Consequently, the overall normalized edginess parameter for the pixel is given by:

$$\alpha = \max_i \{\overline{E}_i\}.$$

As already mentioned, the low-pass and high-pass components, as well as the edginess parameters α, for each pixel are input into the color-matrix application means 4. For a 3-channel color image, for example, an RGB image, the color-matrix application means 4 calculates, for each pixel, the i-th output channel of the matrix-transformed input image (i.e., of the desired color-transformed output image) as follows:

$$C_i' = (C_{1_{LP}} + \alpha C_{1_{HP}})m_{i0} + (C_{2_{LP}} + \alpha C_{2_{HP}})m_{i1} + (C_{3_{LP}} + \alpha C_{3_{HP}})m_{i2} + (1-\alpha)C_{i_{HP}} \ i=1,2,3$$

where $C_{i_{LP}}$ denotes the low-pass component of the pixel for the i-th channel (i-th channel of the low-pass component) and $C_{i_{HP}}$ denotes the high-pass component of the pixel for the i-th channel (i-th channel of the high-pass component) and $m_{ij}$ denotes the i,j coefficient of the color matrix applied by the color-matrix application means 4. The coefficients $m_{ij}$ can be the coefficients of a conventional color matrix.

An example color matrix is:

$$M = \begin{bmatrix} 1.9 & -0.6 & -0.3 \\ -0.3 & 1.6 & -0.3 \\ -0.5 & -0.7 & 2.2 \end{bmatrix}.$$

All previously described embodiments are not intended as limitations, but serve as examples illustrating features and advantages of the disclosed concepts. It is also understood that some or all of the above-described features can be combined in ways different from the ways described.

For example, an apparatus that performs the above-described calculations may be a computing machine such as a microprocessor, microcontroller, or non-instruction-executing circuit. And such a computing machine may be on a same die as, or on a different die than, the image-capture device that captures an image and that generates one or more color components for each pixel of the image.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

The invention claimed is:

1. An apparatus, comprising:
a low pass filter configured to generate a low pass value in response to a first color component of a pixel, the first color component of the pixel being in one of a plurality of channels in a first color space;
a high pass filter configured to generate a high pass value in response to the first color component of the pixel;
an edge detection circuit configured to generate an edginess parameter for the pixel indicating the likelihood the pixel is part of an edge or corner in a digital image containing the pixel; and
a modifier circuit configured to transform the pixel from the first color space to a second color space including a plurality of channels, the modifier circuit configured to transform the pixel using a color transformation matrix including a plurality of coefficients, each coefficient that is utilized in generating a transformed value for the pixel in the second color space being adjusted using the low pass value of the pixel and the low pass values of corresponding pixels in the other channels and also being adjusted using the high pass value of the pixel and the high pass values of the corresponding pixels in the other channels, and wherein the edginess parameter of the pixel is utilized to adjust the high pass value of the pixel and the high pass values of the corresponding pixels but the edginess parameter is not utilized to adjust the low pass value of the pixel and the low pass values of the corresponding pixels in the other channels.

2. The apparatus of claim 1, wherein the high pass filter generates the high pass component based on the difference of the input image and the low pass component.

3. The apparatus of claim 1, wherein the low pass filter has a bandwidth based on a resolution of the input image.

4. The apparatus of claim 1, wherein the edge detection circuit is configured to generate the edginess parameter based on a set of mask patterns utilized to identify vertical, horizontal and diagonal edges in the digital image.

5. A system, comprising:
an image capture device configured to capture an image and to generate a color component of a pixel of the image in a device color space, the color component being in one of a plurality of channels in the device color space; and
an apparatus coupled to the image capture device and including,
a low pass filter configured to generate a low pass value in response to the color component of the pixel;
a high pass filter configured to generate a high pass value in response to the color component of the pixel;
an edge detection circuit configured to generate an edginess parameter for the pixel indicating the likelihood the pixel is part of an edge or corner in a digital image containing the pixel; and
a modifier circuit configured to transform the pixel from the device color space to an output color space including a plurality of channels, the modifier circuit configured to transform the pixel based on a color transformation matrix including a plurality of coefficients, each coefficient that is utilized in generating a transformed value for the pixel in the output color space being varied using the low pass value of the pixel and the low pass values of corresponding pixels in the other channels and also being varied using the high pass value of the pixel and the high pass values of the corresponding pixels in the other channels, and wherein the edginess parameter of the pixel is utilized to vary the high pass value of the pixel and the high pass values of the corresponding pixels but the edginess parameter is not utilized to vary the low pass value of the pixel and the low pass values of the corresponding pixels in the other channels.

6. The system of claim 5 wherein the image capture device and the apparatus are either disposed on respective dies or are disposed on a same die.

7. The system of claim 5 wherein the device color space is device RGB space and wherein the output color space comprises one of the sRGB and Adobe RGB standard color spaces.

8. The system of claim 5 wherein the apparatus includes a computing circuit.

9. The system of claim 5 wherein the image capture device includes a pixel array.

10. A method for color processing of an input image, comprising:
   low pass filtering of the input image to obtain a low pass component;
   high pass filtering of the input image to obtain a high pass component;
   processing the input image for edge detection to obtain edginess parameters; and
   performing a color space transformation of the input image from a first color space to a second color space, each color space including a plurality of channels and the color space transformation being performed using a transformation matrix having a plurality of coefficients, the color space transformation including,
      generating a transformed value for the pixel in the second color space utilizing selected coefficients in the transformation matrix, the selected coefficients having values that are modified,
         by the low pass value of the pixel and the low pass values of corresponding pixels in the other channels,
         by the high pass value of the pixel and the high pass values of the corresponding pixels in the other channels as modified by the edginess parameter, and
      wherein the edginess parameter of the pixel is not utilized to modify the low pass value of the pixel and the low pass values of the corresponding pixels in the other channels.

11. The method of claim 10, wherein the input image is a red-green-blue (RGB) color space image.

12. The method of claim 11, wherein high pass filtering comprises high pass filtering based on the difference of the input image and the low pass component to obtain the high pass component.

13. The method of claim 12, wherein low pass filtering of the input image to obtain a low pass component comprises low pass filtering using a bandwidth selected based on the resolution of the input image.

14. The method of claim 13, wherein processing the input image for edge detection to obtain edginess parameters comprises processing each pixel of the input image to determine a respective edginess parameter for the pixel.

15. The method of claim 14, wherein processing the input image for edge detection to obtain edginess parameters comprises determining the edginess parameters based on a set of mask patterns used to identify vertical, horizontal and diagonal edges and corners in the input image.

16. The method of claim 15, wherein processing the input image for edge detection to obtain edginess parameters comprises processing the pixels of the input image in the RGB color space image in a spatial RGB domain based on information of one or more RGB color channels.

17. A method for color processing of an input image, comprising:
   low pass filtering of the input image to obtain a low pass component;
   high pass filtering of the input image to obtain a high pass component;
   processing the input image for edge detection to obtain edginess parameters;
   performing a color space transformation of the input image based on the low pass component, the high pass component, and the edginess parameters; and
   wherein performing a color space transformation of the input image based on the low pass component, the high pass component, and the edginess parameters comprises performing the color space transformation for each pixel of the input image according to the following equation:

$$C_i' = (C_{0_{LP}} + \alpha C_{0_{HP}})m_{i0} + (C_{1_{LP}} + \alpha C_{1_{HP}})m_{i1} + (C_{2_{LP}} + \alpha C_{2_{HP}})m_{i2} + (1-\alpha)C_{i_{HP}} \quad i=1,2,3$$

where $C_{i_{LP}}$ denotes the low pass component of the i-th channel of the low pass component, $C_{i_{HP}}$ denotes the high pass component of the i-th channel of the high pass component, $\alpha$ denotes the edginess parameter of the pixel, $m_{ij}$ denotes the i,j coefficient of a color matrix, i and j are indices for components of the color matrix, and $C_i'$ is the new color value for the pixel being processed.

18. The method of claim 17, wherein the input image is an RGB image.

19. The method of claim 17, wherein the high pass filtering comprises generating the high pass component based on the difference of the input image and the low pass component.

20. The method of claim 17, wherein the low pass filtering has a bandwidth selected based on a resolution of the input image.

21. The method of claim 17, wherein processing the input image for edge detection to obtain edginess parameters comprises determining for each pixel of the input image a respective edginess parameter.

22. The method of claim 21, wherein processing the input image for edge detection to obtain edginess parameters further comprises determining the edginess parameters based on a set of mask patterns used to identify vertical, horizontal and diagonal edges and corners in the input image.

23. The method of claim 22, wherein processing the input image for edge detection to obtain edginess parameters further comprises determining the edginess parameters in the spatial RGB domain based on information of one or more RGB color channels.

* * * * *